United States Patent [19]

Sumner

[11] Patent Number: 4,465,733
[45] Date of Patent: Aug. 14, 1984

[54] DISPENSER FOR TOILET MATERIALS

[76] Inventor: B. Carmichael Sumner, 220 E. Gaston St., Savannah, Ga. 31401

[21] Appl. No.: 534,653

[22] Filed: Sep. 22, 1983

Related U.S. Application Data

[63] Continuation-in-part of Ser. No. 262,934, May 12, 1981, abandoned.

[51] Int. Cl.³ .............................................. B32B 5/16
[52] U.S. Cl. ...................................... 428/283; 51/294; 428/284; 428/288; 428/289
[58] Field of Search ............... 428/283, 284, 288, 289; 4/300, 315, 222, 223; 181/DIG. 1; 51/DIG. 19, DIG. 21, DIG. 24, 293, 294

[56] References Cited

U.S. PATENT DOCUMENTS

| | | | |
|---|---|---|---|
| 3,248,740 | 5/1966 | Wisnom | 4/109 |
| 3,383,710 | 5/1968 | Sumner | 4/1 |
| 3,843,976 | 10/1974 | Miya et al. | 4/1 |
| 4,010,497 | 3/1977 | Menter et al. | 4/1 |

Primary Examiner—Marion E. McCamish
Attorney, Agent, or Firm—Kenyon & Kenyon

[57] ABSTRACT

The present invention provides for the combination of a fibrous carrier which is readily degradable when wet, and foam-forming materials, that produce a protective layer of fibers and foam on the surface of the water contained in a toilet, so as to inhibit splash and noise associated with the deposition of waste into the toilet bowl.

25 Claims, 5 Drawing Figures

U.S. Patent     Aug. 14, 1984     4,465,733
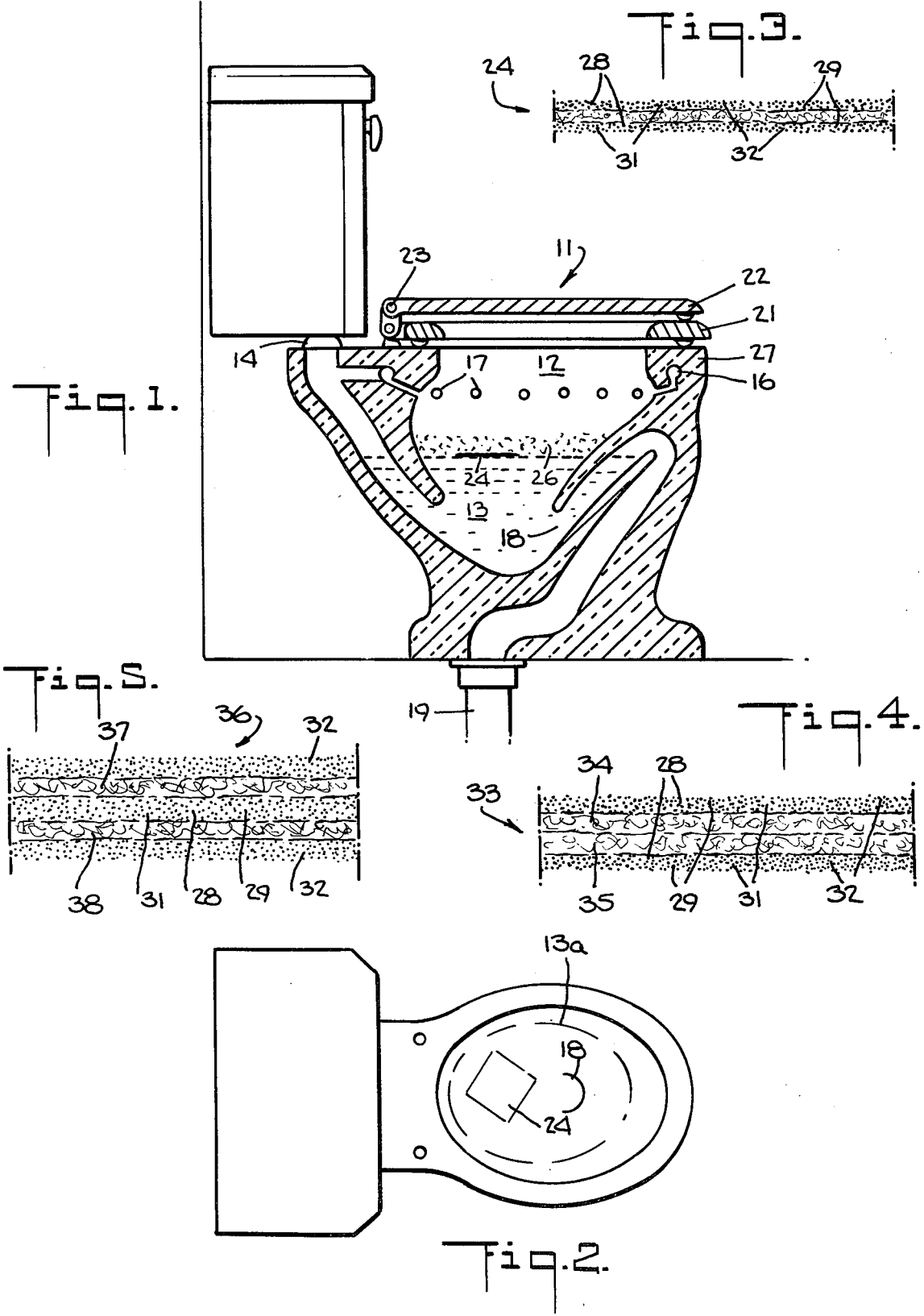

DISPENSER FOR TOILET MATERIALS

This is a continuation in part of my application Ser. No. 262,934, filed May 12, 1981, now abandoned.

BACKGROUND OF THE INVENTION

1. Field of the Invention

This invention relates to a dispenser or carrier in the form of non-woven fibrous sheet material to which chemical materials to be conveyed by the sheet material are attached. The chemical materials may be conveniently retained on the sheet material for dispersal in water when the non-woven material is placed on the surface of the water, and, in particular, the invention relates to a fibrous dispenser of chemicals that produces a layer of fibers and foam on the water in a toilet when the sheet is placed in the toilet, said layer of fibers and foam serving to inhibit splash and noise associated with the deposition of waste into the toilet water. It also relates to a dispenser of cleansing material to assist in keeping the toilet bowl clean.

2. Prior Art

In my U.S. Pat. No. 3,383,710, I discussed a number of examples of materials suitable for producing a layer of foam to cover the water in a toilet bowl immediately before the toilet is used. The materials included effervescing reagents, such as a carbonate or a bicarbonate and an acid. A suitable carbonate is anhydrous sodium carbonate in the form of soda ash, $Na_2CO_3$, and a suitable bicarbonate is sodium bicarbonate, $NaHCO_3$. Acids which, when mixed with these materials, produce the desired effervescence include such reagents as crystallized oxalic acid, $H_2C_2O_4 \cdot 2H_2O$, and citric acid having the formula $(COOH)CH_2C(OH)(COOH)CH_2COOH$. These are by no means the only suitable reagents, but they are widely available and are accepted for use in the home.

In addition to the effervescing materials, the patent discussed some surface-active agents to stabilize the foam. These included Saponin, licorice, castile or similar soap in flake form, finely divided coconut-oil soap flakes or Ivory Snow in commercial form. As in the effervescing materials, this list is by no means exhaustive.

One of the problems of using foam-forming materials in a toilet is that of dispensing the materials in the proper amount and at the proper time. Related to that is the problem of keeping a supply of the materials where they can be easily reached when desired.

My present invention provides for a combination of foam-forming materials and a non-woven fibrous carrier, which combination addresses itself to and solves the aforementioned problems.

An important aspect of the present invention is the ability of the fibrous carrier to degrade or disintegrate upon impact by any body wastes deposited in the toilet bowl. This facilitates the production of the splash-inhibiting foam at the surface of the water in the toilet bowl by maintaining the foam-forming materials at the surface. If, for example, the fibrous carrier has such great wet strength that it will not degrade or disintegrate upon impact by body wastes, the carrier will be pushed underwater by the deposited wastes. This will inhibit and delay formation of foam on the water surface at the point of waste deposit, therefore there will be less effective inhibition of noise and splash. Moreover, the importance of the wet degradability of the carrier stems from the fact that the distintegrated remains of the fibrous carrier will also form a layer of fibers on the water surface of the toilet bowl, providing additional splash inhibition to supplement the splash inhibiting activity of the foam layer.

Others have addressed the problem of splash associated with deposition of human wastes into a toilet bowl. For example, U.S. Pat. No. 4,010,497, which issued to Menter on Mar. 8, 1977, provides for a "Toilet Splash Guard". This splash guard comprises a multiply-slit, coated sheet of paper, which paper itself serves as the medium to inhibit splash created by waste passing through the slits of the paper.

It is also a known practice of some individuals to attempt to muffle noise and reduce splash by wadding up toilet paper and placing it in the toilet bowl before defecating or urinating. However, it is easily verified that such a practice is virtually a futile exercise, providing little abatement of the problem. In any event, these prior approaches to the problem of splash are quite different from the approach of the present invention. As disclosed earlier, the dispenser of the present invention has such weak strength that it disintegrates upon impact by body waste, and in addition and as a further feature of the invention, the foam-forming materials are actually more completely exposed to the water surface to immediately produce a protective blanket of foam at the point of impact, which foam effectively reduces sound and splash. Neither toilet tissue nor the paper product of the Menter patent would have a sufficiently weak wet strength to disintegrate upon impact by body wastes. Any success of the Menter invention depends upon the paper retaining its integrity even while wet, because the paper itself serves as the medium to inhibit splash created by waste passing through the slits of the paper. Toilet paper, of course, is designed to have such great wet strength that it can be used for wiping. Experience reveals that a layer of toilet tissue would retain substantial integrity, just as it is so designed to do, rather than readily disintegrating, when impacted by body wastes.

A further problem not dealt with in my earlier patent but addressed herein, is that of keeping the toilet bowl clean. In some localities that is particularly difficult because of chemicals in the water supply.

OBJECTS AND SUMMARY OF THE INVENTION

It is one of the objects of the present invention to provide a convenient non-woven sheet material of a type that readily absorbs water and is essentially degradable when wet so as to disintegrate upon impact by body wastes, but which forms a support for chemical materials to be placed in the toilet. A supply of such sheets in the form of a roll or pack of them can easily be kept close to a toilet so as to be accessible so that one sheet can easily be removed from the supply and placed in the toilet to form a layer of foam on the water in the toilet just prior to use.

Another object is to provide a fibrous sheet with foam-forming materials pressed in it to adhere to it until the sheet is placed in a toilet, and then to react immediately to produce a layer of foam that completely covers the surface of the water.

Another object is to provide a laminated sheet with different ones of the foam-forming materials on different lamina to be kept separate during manufacture of the laminated sheet so that materials that would react with each other if placed in a common solution, can be deposited out of solution onto separate sheets to be laminated together thereafter.

Still another object of the invention is to provide a non-woven sheet, or pad, impregnated with sufficient foam-forming materials to form a layer of foam that completely covers the water in a toilet bowl to a thickness great enough to muffle the noise of depositing body wastes in the water in the toilet.

A further object is to provide a suitable non-woven sheet material with finely ground abrasive powder attached thereto, said abrasive powder to be swirled against the wall of the toilet bowl in order to help cleanse the wall as the water swirls in leaving the bowl when the toilet is flushed.

Further objects will become apparent from the following specification and the drawings.

In accordance with this invention, materials to be placed on the surface of the water in a toilet bowl immediately before the toilet is to be used in the normal manner are attached to or dispersed in a sheet of non-woven fibrous material that serves as a dispenser. The materials to be attached to the dispenser may include the same foam-forming materials listed in my U.S. Pat. No. 3,383,710 to form a layer of foam on the surface of the water in the toilet bowl. It is important that the sheet of material be of such a nature as to absorb water quickly, so that the water can easily reach the foam-forming materials to activate them. Moreover, it is important that the fibrous sheet of material have such weak wet strength that it disintegrates upon impact by body waste, thereby more completely exposing the foam-forming materials to the water surface to immediately produce a protective blanket of foam at the point of impact, which foam effectively reduces splash and sound. However, prior to the time the sheet is placed in the toilet bowl, when it is dry, it should have sufficient strength to allow it to be handled without any difficulty. It is also desirable that the sheet be bio-degradable in the sewage system.

In addition, or as an alternative, to the foam-forming materials, the dispenser sheet may have abrasive cleanser material attached to it so that when the toilet is flushed, the abrasives will be forced by the outflowing water to rub against the inner wall of the toilet and remove some of the material that would otherwise adhere to that wall. It is important that the abrasive material not be so harsh as to attack the finish on the surface of the bowl.

The sheet may also be made in the form of two layers laminated together. One advantage of forming the sheet in such a manner is to make it possible to enclose the foam-forming materials so that they will not fall off while the dry sheet is being handled before it is tossed into the toilet. In addition, since the effervescing materials must not be brought together in aqueous solution until they reach the toilet bowl water, forming the sheet of two layers permits one of the effervescing materials to be attached to one layer and the other effervescing material to be attached to the other layer while these layers are being separately formed and even if such formation takes place when the non-woven materials of which the layers are produced are wet. After the layers are separately formed, they may be pressed together in the dry state to bring the reacting effervescing materials into close proximity so that they can enter solution almost simultaneously when the laminated sheet is placed in the toilet.

BRIEF DESCRIPTION OF THE DRAWINGS

FIG. 1 is a cross-sectional view of a toilet in which a dispenser according to the present invention has been placed on the surface of the water to form a layer of small-bubbled foam.

FIG. 2 is a top view of the toilet in FIG. 1 with the seat removed to make the lower parts of the toilet visible.

FIG. 3 is a cross-sectional view of a sheet of non-woven material incorporating powdered materials to achieve specific results when placed in a toilet.

FIG. 4 is a laminated sheet of two layers of non-woven materials with powdered materials attached particularly to the outer surfaces of the laminated sheet.

FIG. 5 is a sheet of non-woven material comprising two layers with a layer of foam-forming materials between them, and with abrasive cleanser material on the outer surfaces.

DETAILED DESCRIPTION OF THE INVENTION

FIG. 1 is a cross-sectional view of a typical toilet 11 comprising a bowl 12 to hold a quantity of water 13. An inlet pipe 14 is connected to a circulating conduit 16 that has a plurality of exit holes 17 through which flushing water can be admitted to the interior of the bowl 12. Water flowing out of the toilet leaves through an exit 18 that leads to a drainpipe 19 connected to the sewer system (not shown). The toilet has a seat 21 with a lid 22 attached to the upper side of the toilet by a hinge structure 23.

FIG. 1 shows the toilet 11 shortly after a dispenser sheet 24 has been placed on the surface of the water 13. Enough time has elapsed for foam-forming materials in this sheet to produce a layer of foam 26 consisting of a large number of small bubbles. The thickness of the layer is sufficient to muffle the noise of deposition of the body wastes into the water 13. In addition, the foam substantially reduces any splash that might be caused by the deposition of the body wastes into the water. A suitable, but not necessary, thickness for the foam layer 26 is about 1", and it is desirable that the size of the bubbles be quite small, and preferably less than 1/10" in diameter so that no one bubble will constitute the entire thickness of the foam layer 26 at the location of that bubble. At every point, the layer 26 is desirably several bubbles thick. On the other hand, it would be undesirable for the foam to be so long-lasting as to create any problem in the sewage system in carrying it away.

FIG. 2 shows a top view of the toilet 11 with the seat and lid removed to allow the interior of the bowl 12 to be seen more completely. The bowl 12 is shown with a standard quantity of water 13 in it sufficient to raise the surface of the water so that its perimeter 13a is only slightly smaller than the rim 27 of the bowl 12. This figure reveals a typical configuration of the dispenser sheet 24 as it would appear immediately after having been placed on the surface of the water 13 and before any foam has had time to form. A typical dispenser is less than one-half, preferably about one-quarter, the surface area of the water.

FIG. 3 is a cross-sectional view of a typical non-woven dispenser sheet 24. This sheet includes a large number of granules of particulate matter on its surface and even within the sheet. The matter could also be in the form of a coating or residue on the fibers or even inside the fibers, provided the water 13 can reach and activate the matter quickly. In this embodiment, the granules include a mixture of particles of a reagent 28 and a reagent 29 that, when brought together in solution, give off gas. For example, the particles 28 may be a suitable acid and the particles 29 a suitable carbonate or bicarbonate. Examples of the acid that have been found satisfactory in my prior U.S. Pat. No. 3,383,710 are oxcalic acid and citric acid. The particles 29 may be sodium carbonate or sodium bicarbonate, but it is to be understood that all of these chemical reagents are listed only as examples and should not be considered as limiting the scope of the invention.

The particles 28 and 29 can be attached to the non-woven sheet material 24 by being forceably pressed into the sheet. If they were brought into the same aqueous solution, they would produce the effervescence that they should produce only after being placed in the toilet 11 in FIG. 1, and so they cannot be deposited out of the same aqueous solution into the sheet 24. However, it would be possible to deposit one of the reagents 28 or 29 on the fibers during the formation of the sheet and, after the sheet had dried, to imbed the other reagent in dry form on the dry base. As another alternative, both of the sets of particles 28 and 29 could be deposited together out of a suspension in a non-ionizing liquid onto the non-woven material 24 during the formation of the fibers or the non-woven material or after the material had been formed into a sheet. By utilizing an environment substantially free of an ionizing liquid (e.g. water), this avoids the problem of the foam-forming material prematurely effervescing.

In addition to the materials 28 and 29, the sheet 24 also includes another material 31 having the characteristics of a foam stabilizer, which includes soap. Such material, in aqueous solution, has a lower surface tension than water, and therefore, allows the gas emitted by the effervescing materials 28 and 29 to produce the bubbles that constitute the layer of foam 26 shown in FIG. 1. As stated in my prior U.S. Pat. No. 3,383,710 some examples of typical soaps are castile, coconut-oil soap flakes, and Ivory Snow. Typical foam stabilizers other than soap are Saponin, a licorice, and related materials.

The materials 28, 29 and 31 may be caused to adhere to the sheet of non-woven material 24 by dispersing powdered effervescing and foam stabilizing material on the surface of the sheet and pressing the powders into the sheet. Alternatively, or in addition, bonding material, such as was suggested in my prior patent, to bond the foam-forming materials together to form a tablet, may be used to cause the materials to adhere to the sheet 24. Such materials may include a gum, for example, karaya gum, gum arabic, or a high-viscosity methylcellulose.

In order to provide a foam layer 26 (FIG. 1) of desirable thickness, it is necesary to provide enough of the foam-forming materials. It is desirable that the effervescing materials be combined in a stoichiometric ratio and that they comprise the major part of the materials added to the sheet 24. Approximately 1-4% of the foam-forming materials should be a stabilizer, such as Saponin and approximately 1-4% may be a soap, such as castile or a similar type. If the effervescing materials are citric acid and sodium bicarbonate, it is appropriate to use approximately 200 parts of the citric acid, 260 parts of the sodium bicarbonate, and approximately 3 parts of a foam stabilizer, such as high-viscosity methylcellulose. In addition, the materials added to the sheet 24 may include approximately 5 parts of finely divided coconut oil soap flakes or Ivory Snow in commercial form, together with finely divided gum karaya in an amount of about 3-5 parts.

Particles or grains 32 of a suitable cleanser may also be added to the sheet 24, either along with the materials 28, 29 and 31, or separately. The particles 32 include a mild abrasive of a type suitable for household use. This material may include a soap component along with another component, such as pumice or other powdered material having a crystalline-type nature so that it can remove residue that tends to cling to the wall of the bowl 12 (Fig.1). In order to best achieve this result, the abrasive material preferably has a specific gravity less than that of water, therefore it is light enough to float on the water so that when the toilet 11 (FIG. 1) is flushed, the abrasive particles will be wiped across the surface of the bowl 12 and will tend to remove some of the residue. Some toilets are constructed so that the water 13 swirls around a number of times during the flushing cycle, and in such toilets, the abrasives may be wiped across the surface of the wall 12 several times so as to scour it during the brushing operation. Even if the scouring is not complete and a certain amount of residue remains, the toilet 11 will be more completely cleansed than it would be in the absence of the abrasive material 32.

The abrasive material should not be so harsh as to attack the usual procelain finish of the wall of the bowl 12. There are well-known household cleansers that are suitable for the purpose. Finely ground pumice may be used alone or with powdered soap or detergent materials as the abrasive material. In addition, the abrasive material, which may include a cleansing material, may also include additional chemicals required to remove or dissolve residue material on the wall of the bowl 12. It may be desirable to provide different chemicals in different localities, depending on the contents of the water supply.

FIG. 4 shows a modified embodiment 33 of a non-woven sheet according to this invention. This sheet is laminated of two layers 34 and 35 of non-woven material, which may be the same as the non-woven material in the sheet 24 in FIG. 3. These layers may be pressed together to cause their fibers to interlock sufficiently to hold them together. One of the layers 34 may include one of the effervescing reagents 28, along with a material 31 that reduces the surface tension of the water, as is required to produce foam. In addition, the layer 34 may include particles 32 of the abrasive material, which as previously stated, may include cleansing material.

The other layer 35 may include the other effervescing material 29, along with the foam stabilizer 31 and the abrasive material 32. This separation of the effervescing materials makes it possible to deposit each of them from an aqueous solution or a suspension onto a separate layer. These layers can then be allowed to dry to form the layers 34 and 35 and then forcibly pressed together. All of the materials 28, 29, 31 and 32 may be bonded to the non-woven material.

The fact that the sheet 33 is shown as comprising two layers 34 and 35 does not mean that it is limited to just two layers. It may include one or more additional layers, either between or outside of the layers 34 and 35 to carry some of the particles or other chemicals or to provide better control of the dry strength. As many layers may be used as do not interfere with the ability of the wet carrier to readily degrade upon impact by body waste.

FIG. 5 shows another embodiment of a non-woven, composite fibrous sheet 36 that comprises two layers 37 and 38 pressed together. This sheet can also include more than two layers. In this embodiment, the effervescing material 28 can be attached to one surface of the layer 37 and the effervescing material 29 attached to one surface of the other layer 38 prior to bringing those layers together. The foam stabilizer 31 can be attached to either of the layers or to both of them. The abrasive particles may be crystals that dissolve slowly so as not to clog up septic tanks and the like, thus making the dispensers more acceptable in non-urban areas.

It should be understood that in any of the embodiments in FIGS. 3–5, it is not necessary to place all of the materials on the sheet, although it is desirable to do so in order that the appropriate quantities will be brought into solution in the water 13 simultaneously.

It will be recognized by those skilled in the art that modifications may be made in this invention without departing from the true scope thereof as defined by the following claims.

What is claimed is:

1. A dispenser for use in toilet bowls, said dispenser comprising:
   a sheet of non-woven fibrous material comprising fibers loosely bonded to each other to form a sheet that can be handled in its dry form but absorbs water quickly when placed on the water in a toilet bowl and is essentially degradable when wet so as to readily disintegrate upon impact by body waste; and
   foam-forming material attached to the fibrous material to react in the presence of water in a toilet bowl to generate a layer of small-bubbled foam, the quantity of foam being sufficient to substantially cover the exposed surface of water in the toilet bowl to a depth sufficient to muffle noise due to the deposition of body wastes into the water and to reduce splash caused by the deposition of the body wastes into the water.

2. The invention as defined in claim 1 in which the foam-forming material comprises effervescent chemicals bonded to the fibers to react with each other in the water in the bowl to emit gas.

3. The invention as defined in claim 1 in which the foam comprises bubbles not substantially greater than approximately 1/10" in diameter and the foam layer is at least several bubbles thick at every point.

4. The invention as defined in claim 1 in which the foam-forming material comprises a stabilizer having, in solution, a lower surface tension than water.

5. The invention as defined in claim 1 comprising, in addition: finely divided abrasive material attached to the fibrous material, said abrasive material to be rubbed against the inner surface of the toilet bowl as the water in the bowl circulates when the toilet is flushed.

6. The invention as defined in claim 5 in which the abrasive material has a specific gravity less than that of water.

7. A degradable dispenser for use in toilet bowls, said dispenser comprising:
   a sheet of non-woven fibrous material comprising multiple fibers bonded to each other to form a sheet that has sufficient dry strength to maintain its integrity when handled in its dry form but that absorbs water quickly when placed on the water in a toilet bowl and is essentially degradable when wet so as to disintegrate upon impact by body wastes, the bonding of the fibers being sufficiently loose to cause the sheet to have a wet strength much lower than its dry strength; and
   foam-forming materials attached to the sheet to react with each other in the presence of the water in the toilet bowl to generate a layer of small-bubbled foam that substantially covers the surface of the water to a depth sufficient to reduce noise due to the deposition of body wastes into the water and to reduce splash caused by the deposition of the body wastes into the water, the foam-forming materials comprising effervescent materials and which, when wet, produce a bubble film having a lower surface tension than water.

8. The invention as defined in claim 7 comprising, in addition: finely ground abrasive material attached to the non-woven fibrous material, said abrasive material to be brought into wiping contact with the inner wall of the toilet bowl when the toilet is flushed, thereby to wipe away residue clinging to the inner wall of the toilet bowl.

9. The invention as defined in claim 8 in which the abrasive material is finely ground pumice.

10. The invention as defined in claim 8 in which the area of the sheet is not greater than approximately half the area of the surface of the water in the toilet bowl.

11. A degradable dispenser for use in toilet bowls, said dispenser comprising:
    a laminated sheet comprising first and second layers of non-woven fibrous material comprising fibers loosely bonded to each other to form a sheet that can be handled in its dry form but that absorbs water quickly when placed on the water in a toilet bowl and in its wet condition is readily degraded upon impact by body wastes; and
    foam-forming materials attached to the laminated sheet to react in the presence of water to generate a layer of small-bubbled foam comprising bubble film having a lower surface tension than water, the quantity of foam being sufficient to substantially cover the exposed surface of water in the toilet bowl to a depth sufficient to muffle noise due to the deposition of body wastes into the water and to reduce splash caused by the deposition of the body wastes into the water.

12. The invention as defined in claim 11 comprising, in addition: finely divided abrasive material attached to the sheet, said abrasive material to be rubbed against the inner surface of the toilet bowl as the water in the bowl circulates when the toilet is flushed.

13. The invention as defined in claim 12 in which at least some of the foam-forming materials are primarily between the sheets.

14. The invention as defined in claim 11 in which the foam-forming materials comprise a first material which reduces the surface tension of water to allow the formation of bubbles, and second and third materials that react with each other in water to effervesce, the multiple fibers of each of the layers being mechanically bonded to other fibers in the same layer and the layers being in surface-to-surface contact with each other with fibers of each of the layers mechanically bonded to fibers of the other layer, the second material being primarily attached to the fibers of the first layer, the third material being primarily attached to the fibers of the second layer, and the first material being attached to at least one of the layers.

15. The invention as defined in claim 14 in which each of the foam-forming materials are attached primarily to the surfaces of the respective layers facing the other layer to prevent the foam-forming materials from being prematurely detached from the sheet.

16. The invention as defined in claim 14 comprising at least one more of the layers to carry at least one of the materials.

17. A degradable dispenser for use in toilet bowls, said dispenser comprising:
a sheet of non-woven fibrous material comprising fibers relatively loosely bonded to each other to form a sheet that can be handled in its dry form but that absorbs water quickly when placed on the water in a toilet bowl and is readily degraded upon impact by body wastes when wet; and
finely divided abrasive material attached to the sheet, said abrasive material to be rubbed against the inner surface of the toilet bowl as the water in the bowl circulates when the toilet is flushed.

18. The invention as defined in claim 17 comprising, in addition: foam-forming materials attached to the laminated sheet to react in the presence of water to generate a layer of small-bubbled foam comprising bubble film having a lower surface tension than water, the quantity of foam being sufficient to substantially cover the exposed surface of water in the toilet bowl to a depth sufficient to muffle noise due to the deposition of body wastes into the water and to reduce substantially any splash caused by the deposition of the body wastes into the water.

19. The method of producing a degradable dispenser for use in toilet bowls, the dispenser comprising a sheet of non-woven fibrous material having sufficient dry strength to be handled in its dry form, the fibers being sufficiently loosely bonded together to absorb water quickly when placed on the water in a toilet bowl so as to have a wet strength much weaker than its dry strength so that when on water the dispenser will readily degrade upon impact by body wastes, the method comprising the step of causing foam-forming material to be attached to the fibrous material in an environment which is substantially free of an ionizing liquid at any time that the presence of said liquid would cause the foam-forming material to prematurely effervesce.

20. The invention as defined in claim 19 in which the foam-forming material comprises gas-forming and film-forming materials mixed together, distributed on the fibrous material, and pressed into the fibrous material, all in the dry state.

21. The invention as defined in claim 19 in which the gas-forming materials are carried in a non-ionizing liquid while being mixed together and distributed on the fibrous material.

22. The invention as defined in claim 19 comprising the additional step of pressing firmly ground abrasive material into the fibrous material to bond therewith.

23. The invention as defined in claim 22 in which the finely ground abrasive material is mixed with chemical bonding material prior to being pressed into the fibrous material, the resultant mixed material being pressed into the fibrous material to bond therewith.

24. The invention as defined in claim 23 in which the mixed material is pressed into the fibrous material in a wet condition to activate the chemical bonding material and strengthen the bond between the abrasive material and the fibrous material, the invention further comprising the step of drying the bonded fibrous material and abrasive material prior to distributing the foam-forming material thereon.

25. The invention as defined in claim 19 in which the foam-forming material comprises first and second reagent materials that react with each other in the presence of water to effervesce, and the sheet of fibrous material comprises first and second layers of fibrous material, the method further comprising:
depositing the first reagent material on the first layer;
depositing the second reagent material on the second layer;
drying the layers; and
pressing the dried layers together to interlock the respective fibers thereof.

* * * * *